United States Patent [19]

Kimura et al.

[11] Patent Number: 4,982,891
[45] Date of Patent: Jan. 8, 1991

[54] METHOD AND SYSTEM FOR FORMING A THREE-DIMENSIONAL FRAME STRUCTURE

[75] Inventors: Shizuo Kimura; Yukihisa Watano; Sachihiro Yamashita; Masayuki Enomoto, all of Sayama, Japan

[73] Assignee: Honda Giken Kogyo Kabushiki Kaisha, Tokyo, Japan

[21] Appl. No.: 389,005

[22] Filed: Aug. 3, 1989

[30] Foreign Application Priority Data

Aug. 3, 1988 [JP] Japan .................. 63-193953

[51] Int. Cl.⁵ .................................. B23Q 41/02
[52] U.S. Cl. ........................... 228/47; 414/356; 414/745.9; 228/155
[58] Field of Search ............ 228/155, 47; 414/745.7, 414/745.9, 746.1, 356, 754

[56] References Cited

U.S. PATENT DOCUMENTS 4,388,039  6/1983  Schwarze .................. 414/745.9

FOREIGN PATENT DOCUMENTS 35-54229  3/1960  Japan.
125232    7/1984  Japan ..................... 228/155

Primary Examiner—Kenneth J. Ramsey
Attorney, Agent, or Firm—Eckert, Seamans, Cherin & Mellot

[57] ABSTRACT

A method and a system for forming a rod-like member into a three-dimensional frame structure, involving a work feed station for individually feeding a rod-like member, a bending station for bending the rod-like member having a prescribed length into a two-dimensional frame structure, a welding station for welding two mutually abutting ends of the two-dimensional frame structure of the rod-like member; and a forming station for plastically forming the two-dimensional frame structure into a three-dimensional frame structure. Typically, the two dimensional structure comprises a loop structure formed by joining two opposite ends of the rod-like member by welding, and the rod-like member consists of a pipe member. Thus, by welding the mutually abutting parts of the rod-like member together when it is formed into a two-dimensional frame, retaining the rod-like member for the welding is simplified as it involves the retaining of the rod-like member against its positional variations only in one direction. Further, by stamp forming or otherwise plastically forming the two dimensional frame structure including a loop, a three-dimensional structure having a high dimensional accuracy can be produced.

5 Claims, 7 Drawing Sheets

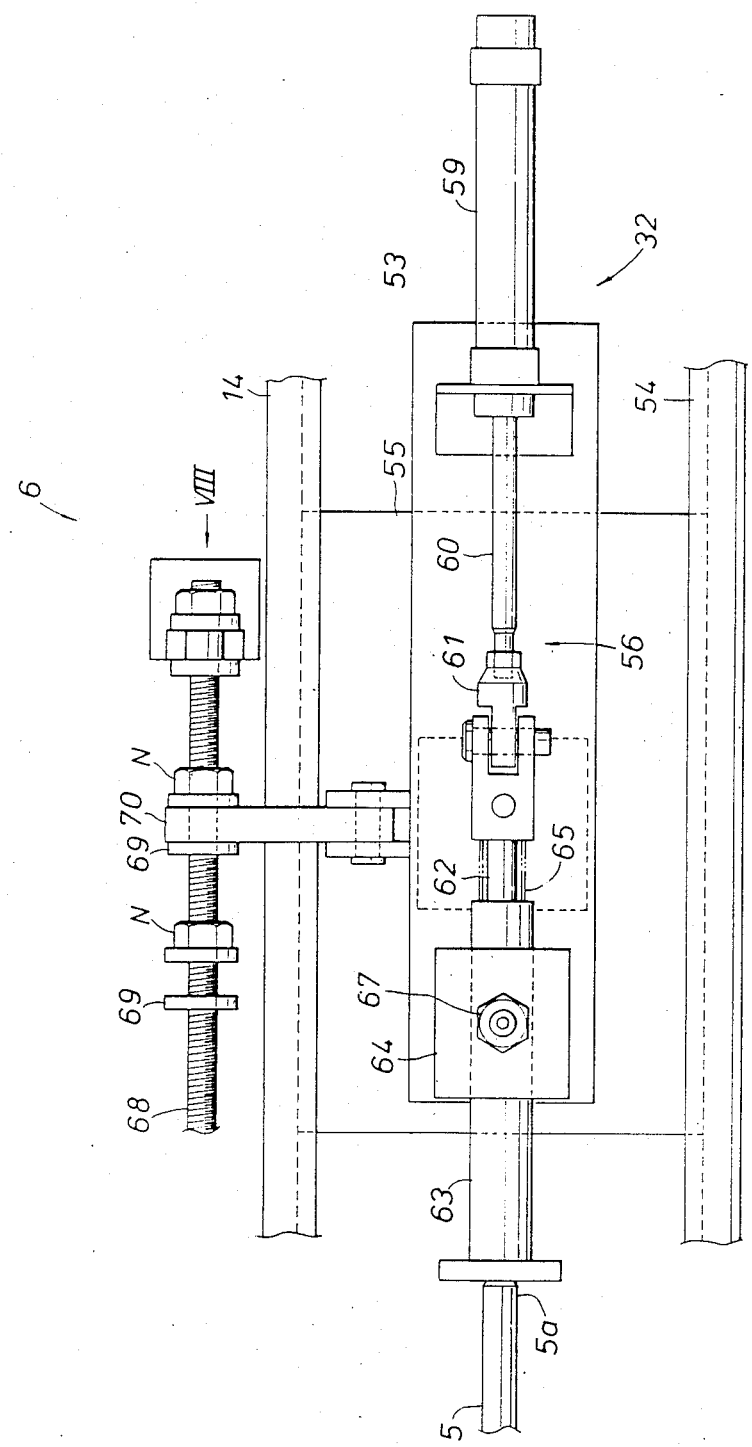

METHOD AND SYSTEM FOR FORMING A THREE-DIMENSIONAL FRAME STRUCTURE

TECHNICAL FILED

The present invention relates to a method and a system for forming a three-dimensional structure from a rod-like member, and in particular to such a method and a system which are suitable for use in producing three-dimensional seat frames and other structures including loops therein in a highly automated production process.

BACKGROUND OF THE INVENTION

Conventionally, seat frames for automobiles having three-dimensional structures have been produced by bending steel pipe members into desired three-dimensional shapes by benders and then welding the abutting ends of the steel pipe members.

However, according to such a conventional process, handling of the pipe members presents some difficulty if any attempt is made to automate the process, and ensuring a high precision level is also difficult particularly when the shape of the frame to be produced is complicated. Furthermore, since the pipe members tend to elastically restore their original shapes (or to spring back) after bent into desired three-dimensional shapes, some difficulties arise in welding two abutting parts of the pipe members together. Also, conveying the three-dimensional work to the succeeding stations involves some difficulty.

Japanese patent laid-open publication No. 60-54229 proposes an automated pipe working system, but this system requires readjusting of the jigs for supporting the pipe so many times that the system is not suitable for forming pipe frames having complicated three-dimensional structures.

BRIEF SUMMARY OF THE INVENTION

In view of such problems of the prior art, a primary object of the present invention is to provide a system and a method for forming three-dimensional frame structures from rod-like members such as pipe members which are suitable for use in a highly automated production line.

A second object of the present invention is to provide such a system and a method which can form three-dimensional structures with high dimensional precision.

According to the present invention, these and other objects of the present invention can be accomplished by providing a method for forming a rod-like member into a three-dimensional frame structure, comprising the steps of bending a rod-like member having a prescribed length into a two-dimensional frame structure, welding mutually abutting parts of the two-dimensional structure of the rod-like member together, and forming the two-dimensional structure into a desired three-dimensional frame structure; or a system for producing a three-dimensional frame structure from a rod-like member, comprising a work feed station for individually feeding a rod-like member, a bending station for bending the rod-like member having a prescribed length fed from the work feed station into a two-dimensional frame structure, a welding station for welding two mutually abutting parts of the two-dimensional frame structure of the rod-like member transferred from the bending station together; and a forming station for plastically forming the two-dimensional frame structure into a three-dimensional frame structure.

Typically, the two-dimensional structure comprises a loop structure formed by joining two opposite ends of the rod-like member by welding, and the rod-like member consists of a pipe member.

Thus, by welding the mutually abutting parts of the rod-like member together when it is formed into a two-dimensional frame, retaining the rod-like member for the welding is simplified as it involves the retaining of the rod-like member against its positional variations only in one direction. Further, by stamp forming or otherwise plastically forming the two dimensional frame structure including a loop, a three-dimensional structure having a high dimensional accuracy can be produced.

Preferably, the work feed station comprises a bin for storing a plurality of rod-like members in mutually parallel relationship, and an elevator located adjacent to the bin, the bin including a slot narrower than a length of the rod-like member and extending vertically along a substantially entire height of a side of the bin facing the elevator, and the elevator including endless chain means carrying a plurality of arm members which project into the bin through the slot and are adapted to be moved substantially in upward direction along the slot. Even more preferably, the work feed station further comprises an actuator for tipping the bin, around a center line extending in parallel with the rod-like members, towards the elevator. Thus, feeding of rod-like members can be made in highly efficient manner by using an extremely simple system.

According to a preferred embodiment of the present invention, the work feed station further comprises a carriage adapted to be moved along a rail extending in parallel with the rod-like members for replacing the bin with another so that changing the pipe members can be simply performed, and so that the same pipe feed station can be adapted to different rod-like members simply by charging different rod-like members into different bins.

According to a preferred embodiment of the present invention, a length measuring station is provided between the work feed station and the bending station, the length measuring station comprising a stationary reference wall supported by a base at one of its lateral ends, a pusher member slidably received by the base at the other lateral end so as to be moved toward and away from the reference wall, an actuator for effecting a sliding movement of the pusher member, work guide means for guiding the rod-like member into a space defined between the reference wall and the pusher member with one end of the rod-shaped member adjoining the reference wall and the other end of the rod-like member adjoining the pusher member, and measuring means for measuring a travel of the pusher member as it is moved by the actuator from its rest position to a final position at which the rod-like member abuts the reference wall at its one end and the pusher member at its other end. Preferably, the pusher member is supported by the base by way of adjustable means for adjusting the position of the rest position relative to to the reference wall.

Thus, the lengths of different pipe members can be measured simply by adjusting the adjustable means or, for instance, moving a table carrying the pusher member to appropriate locations without changing the time required for the measurement of each pipe member. This is significant when the length measuring station is a part of a large manufacturing line involving a large number of different stations which are required to be synchronized with one another for efficient operation of the entire manufacturing line.

To simplify the actual determination of the precision of the length of each pipe member, a sensor such as a proximity sensor may be used for detecting a final position of the pusher member when the rod-like member abuts both the reference wall and the pusher member. Thus, since the measurement does not necessarily require any actual measurement of any value according to the present embodiment, the process as well as the device for measurement can be simplified.

BRIEF DESCRIPTION OF THE DRAWINGS

Now the present invention is described in the following with reference to the appended drawings, in which:

FIG. 7 is a plan view of the pusher unit; and

DETAILED DESCRIPTION OF THE PREFERRED EMBODIMENTS

Figure 1:
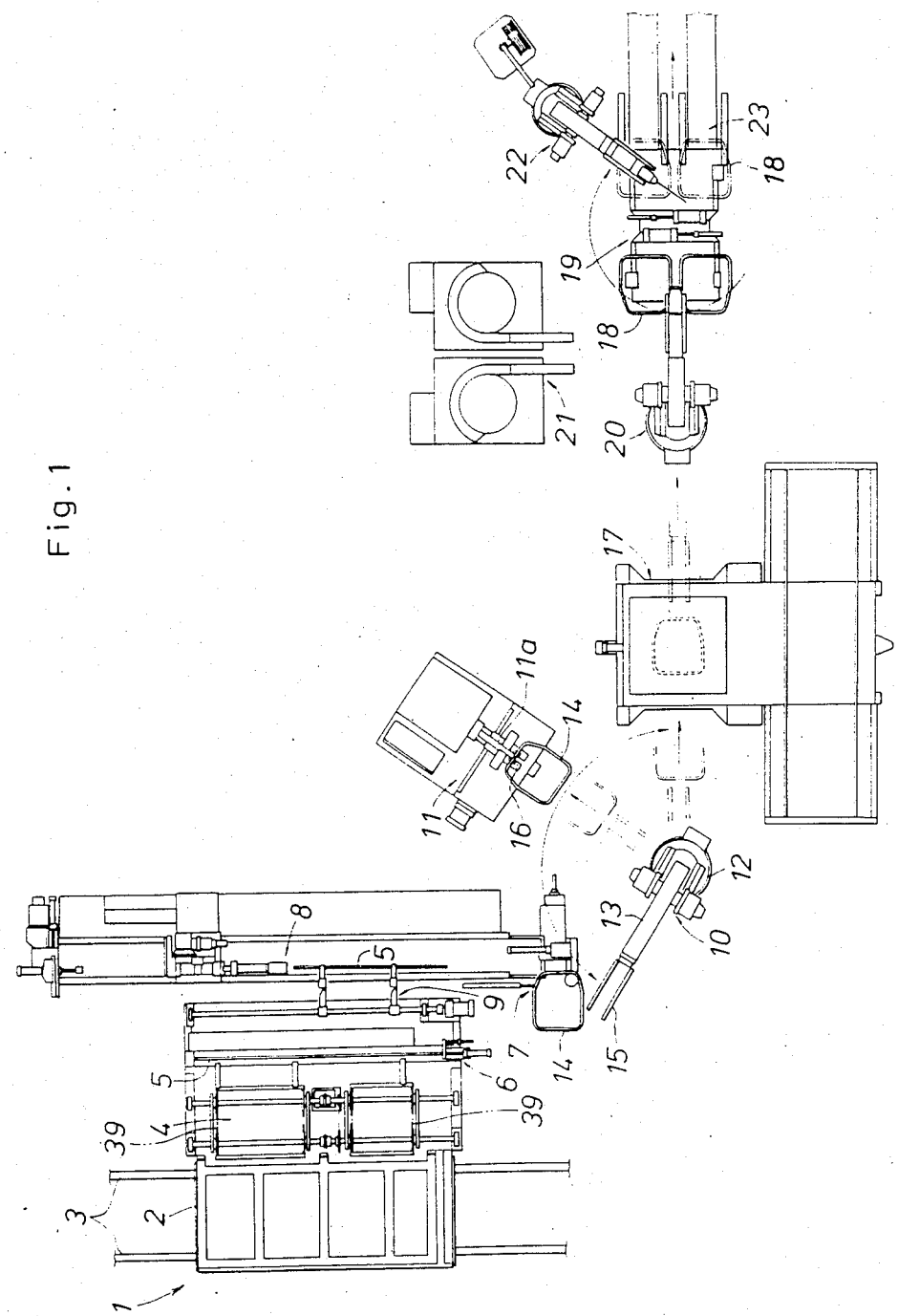
FIG. 1 is a general plan view of a seat frame production line according to the present invention.
Figure 2:
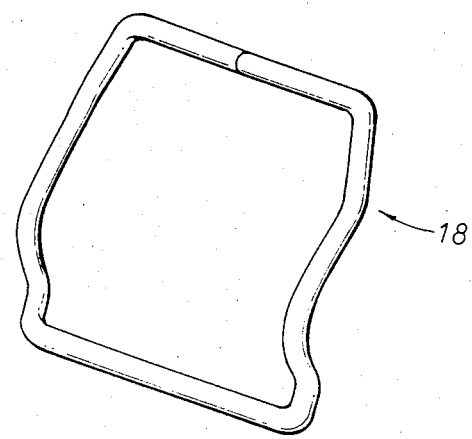
FIG. 2 is a perspective view of a seat frame which can be produced by the production line of FIG. 1.
Figure 8:
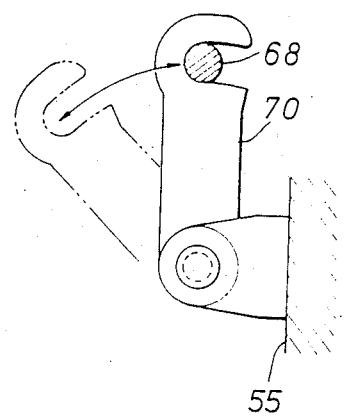
FIG. 8 is a sectional view as seen from arrow VIII of FIG. 7.

FIG. 1 shows a seat frame production line for producing annular and rectangular three-dimensional pipe frames 18 for vehicle seats, such as the one illustrated in FIG. 2, from straight steel pipe members 5 having a prescribed length. As shown on the right hand side of FIG. 1, in a pipe feed station 1, a pair of rails 3 are laid for a carriage 24 which carries a bin 2 containing a certain number of pipe members 5 so that such pipe members 5 may be fed to this production line without any break.

An elevator unit 4 is provided adjacent to the stationary bin 2 to transfer the pipe members 5 from the bin 2 to a length measuring station 6. The elevator unit 4 comprises endless chains 39 and a plurality of arm members 43 extending therefrom at equal interval as described hereinafter. Those pipe members 5 with excessive dimensional errors are rejected at the length measuring station 6.

Those pipe members 5 having acceptable dimensional accuracy are picked up, one by one, by a pipe gripper 9 which is adapted to rotate around an axial line in parallel with the pipe member 5, and are passed on to a pipe transfer device 8 for moving the pipe members 5 along its longitudinal direction from the length measuring station 6 to a succeeding NC bender 7 one by one.

The pipe member 5 fed into the NC bender 7 is bent at appropriate parts thereof, and is formed into a two-dimensional frame structure 14. In the present case, the pipe member 5 is formed into an annular and rectangular seat frame. The two-dimensional frame structure 14 is then transferred to a welding station 11 by a robot 10 having a rotatable column 12, a telescopic arm 13 carried by the rotatable column 12, and a hand 15 provided in the free end of the arm 13 for actually gripping the two-dimensional frame structure 14.

The welding station 11 is provided with a retaining jig 16 for abutting together the two ends of the pipe member 5 which tend to stay away from each other because of the elastic property of the pipe member 5 even after the pipe member 5 has been formed into the two dimensional frame structure 14, and a welding head 11a for welding them together.

The two-dimensional frame structure 14 which has been welded into a complete annular shape at the welding station 11 is then carried by the same robot 10 onto a lower metallic die of a press station 17, and is them press formed into a desired three-dimensional frame structure 18 between an upper metallic die which is placed onto the surface of the lower metallic die interposing the two-dimensional frame structure 14 therebetween. The three-dimensional frame structure 18 is then transferred by another robot 20 to an attachment welding station 19 where a small attachment piece fed from a parts feeder 21 is welded to the three-dimensional structure 18 by a welder robot 22, and the seat frame F thus completed is dropped onto a belt conveyer 23.

Figure 3:
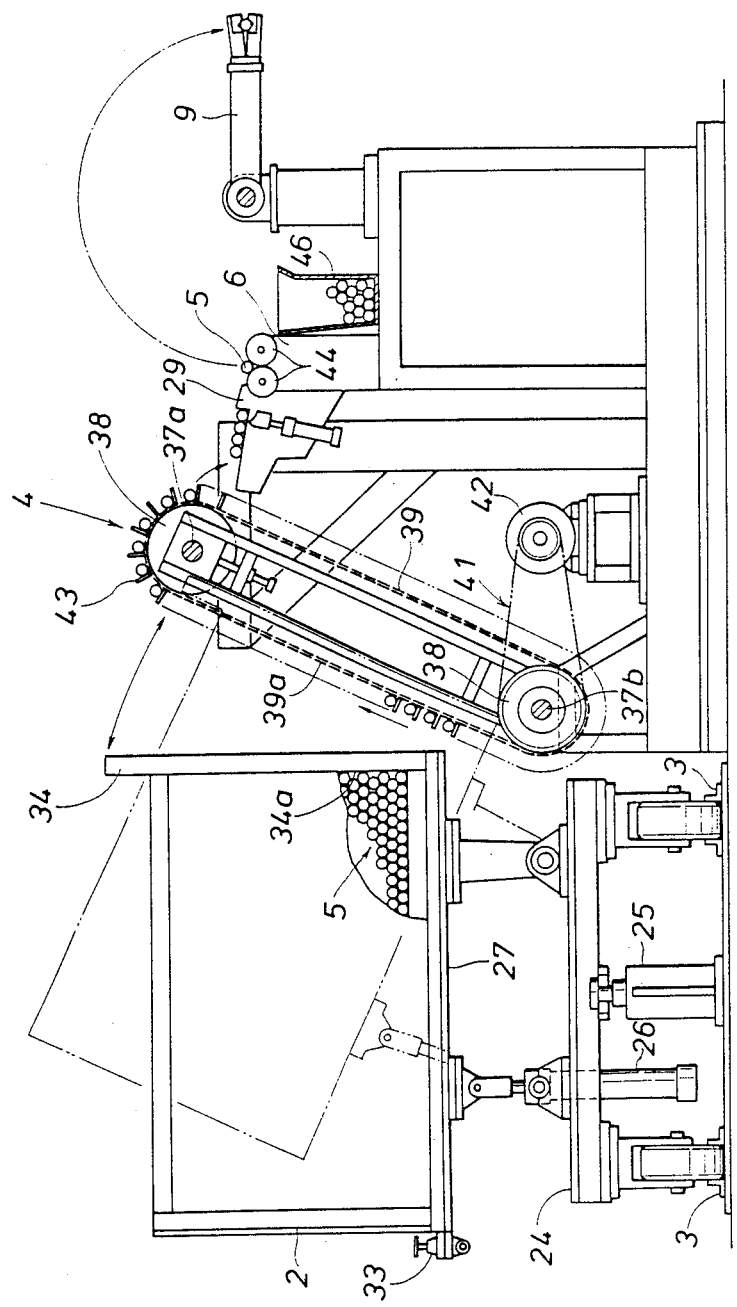
FIG. 3 is a partly broken away side view of a pipe feed station of the production line illustrated in FIG. 1.
Figure 4:
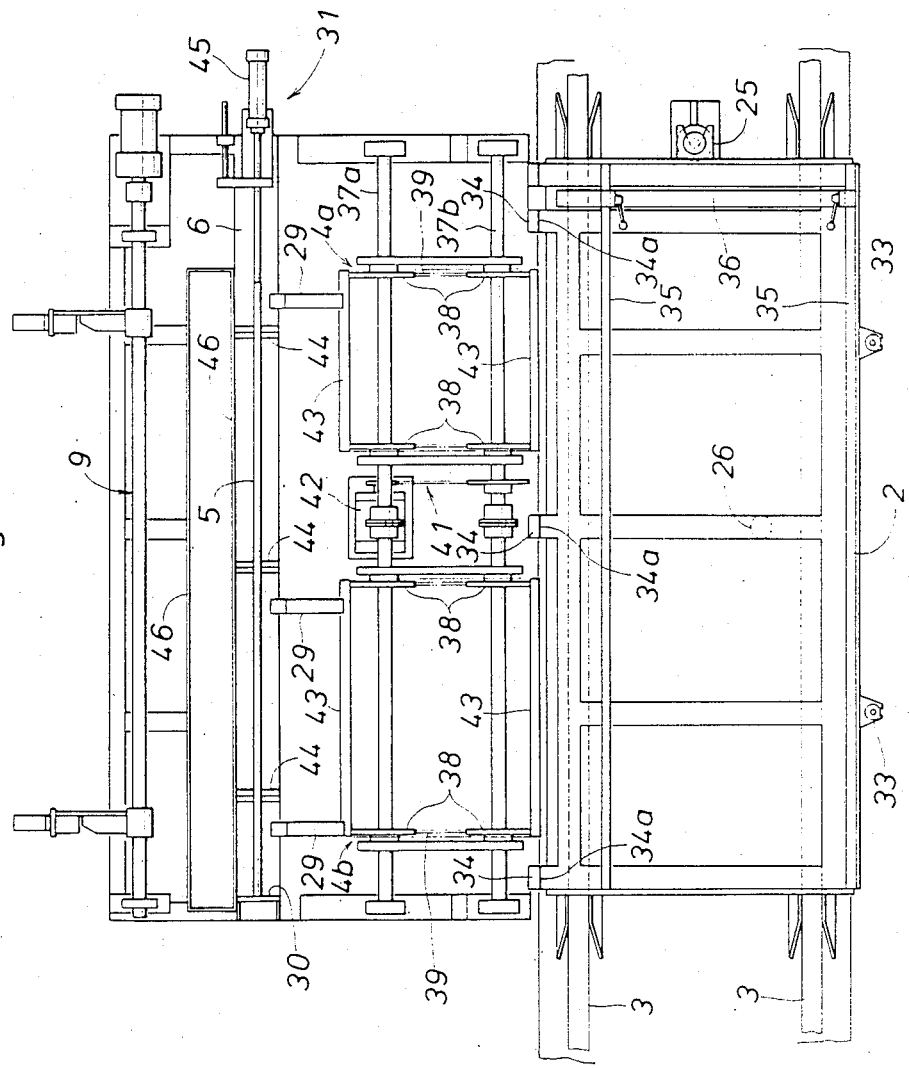
FIG. 4 is a plan view of the pipe feed station.
Figure 5:
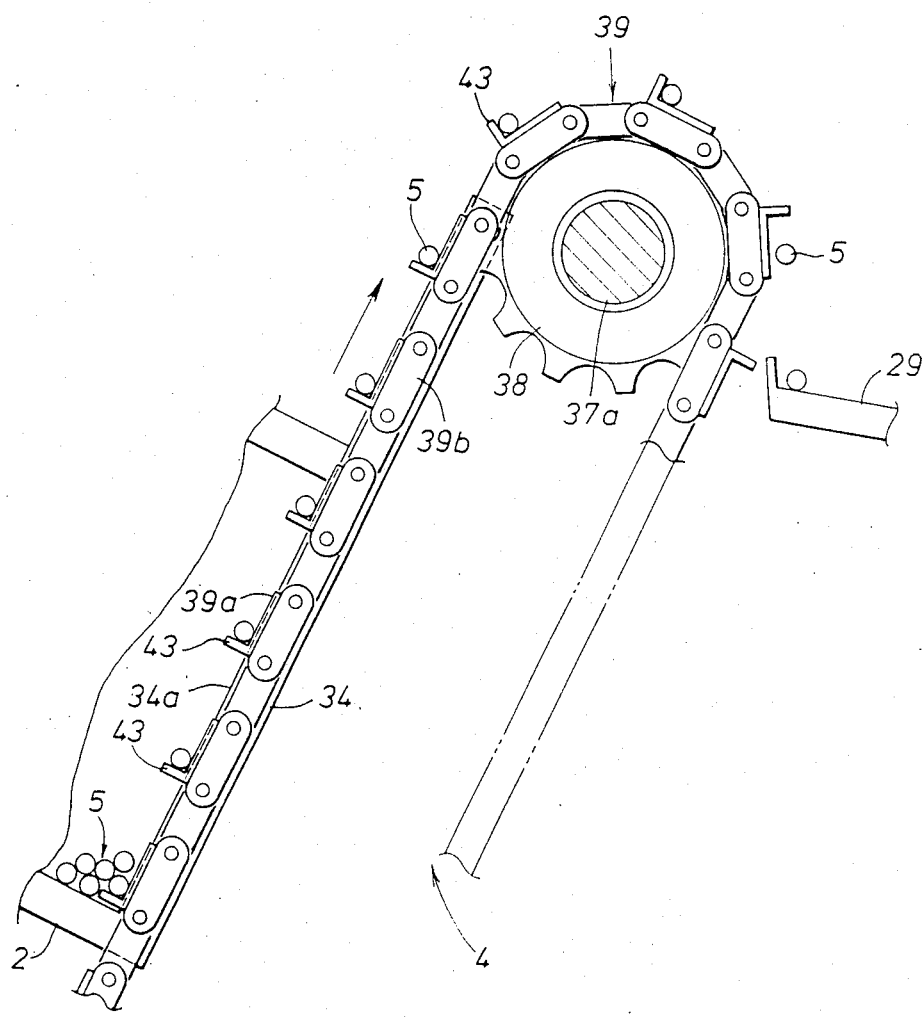
FIG. 5 is an enlarged fragmentary side view of the pipe feed station.
Figure 6:
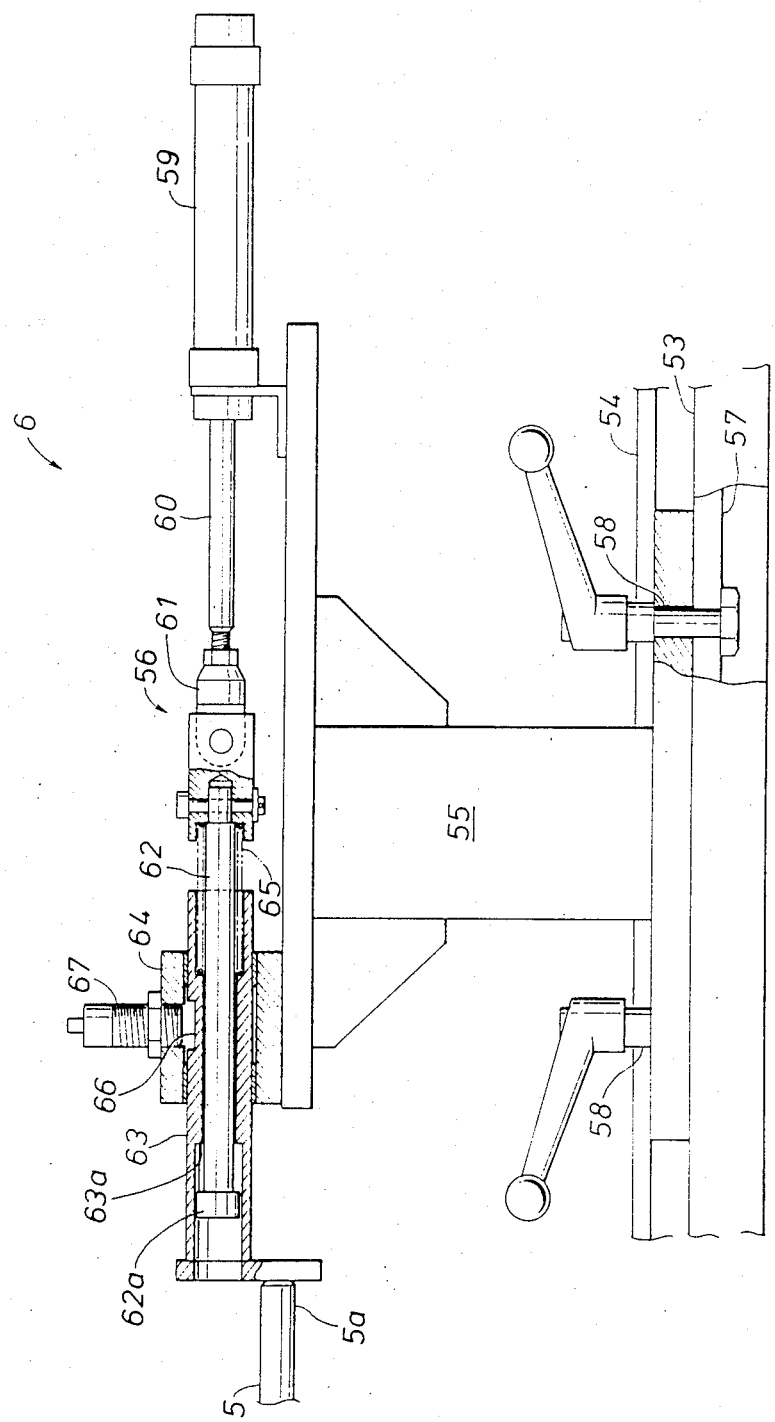
FIG. 6 is a side view of the pusher unit partly in section.

FIGS. 3 through 5 show the structures of the bin 2, and the elevator unit 4 in more detail.

The bin 2 carried by the carriage 24 is stopped at its prescribed position by means of a positioner device 25. The carriage 24 is further provided with a dump table 27 which is adapted to be tipped towards the elevator unit 4 by means of a hydraulic cylinder 26. The dump table 27 is provided with a clamp device 33 for securing the bin 2 thereon.

The bin 2 consists of steel angles and steel plates which are welded together into a rectangular box, and its upper side and one of its lateral sides facing the elevator unit 4 are substantially opened up. However, the side of the bin 2 facing the elevator unit 4 is provided with columns 34 at its either end and at its center, defining a pair of open slots therebetween. Thus, the pipe members 5 stored in the bin 2 are supported by the inner surfaces 34a of the columns 34 even when the bin 2 is tipped towards elevator 4 by the dump table 27.

A support plate 36 is provided on one inner lateral side of the bin 2 so as to be manually adjustable. The support plate 36 supports and aligns one ends of the pipe members 5, and its position may be adjusted according to the length of the pipe members 5 to be handled The elevator unit 4 comprises a pair of rotary shafts 37a and 37b which are vertically spaced from each other and extend in parallel with the rails 3, four sprockets 38 fixedly secured to each of the rotary shafts 37a and 37b, and the chains 39 which are passed around these sprockets 38. In the present embodiment, the four endless chains 38 are passed around these sprockets 38 so as to extend between the two rotary shafts 37a and 37b in mutually parallel relationship in such a manner that two sets of elevators 4a and 4b are formed. Between these two sets of elevators 4a and 4b is disposed an electric motor 42 which drives one of the rotary shafts 37b by way of a chain and sprocket mechanism 41. As can be seen from FIGS. 3 and 4, the upper rotary shaft 37a is slightly further away from the bin 2 than the lower rotary shaft 37b so that a conveying plane 39a defined by the endless chain 39 is slightly slanted away from the bin 2.

The two elevators 4a and 4b are mutually synchronized so as to function as a single elevator unit 4, and each of the endless chains 39 is provided with a plurality of L-shaped arm members 43 projecting outwardly from the conveying plane 39a at equal interval as best shown in FIG. 5.

Now the operation of the pipe feed station 1 including the carriage 24 and the elevator unit 4 is described in the following.

The pipe members 5 are initially charged into the bin 2 at a station preceding the pipe feed station 1, and the bin 2 is carried to the pipe feed station 1 by the carriage 24. When the carriage 24 has reached its prescribed position and has been secured there at by the positioner device 25, the hydraulic cylinder 26 is actuated so as to tip the dump table 27 along with the bin 2 towards the elevator unit 4 as shown by the imaginary lines in FIG. 3. As a result, the pipe members 5 in the bin 2 are urged by gravity towards the side of the bin 2 facing the elevator unit 4 on the one hand, and the free ends of the L-shaped arm members 43 project into the bin 2 through the slots defined between the columns 34 of the bin 2 on the other hand. Since the length of the free ends of the arm members 43 projecting into the bin 2 is so determined that the free end of each of the arm members 43 carries one of the pipe members 5 upwards along the slanted conveying plane 39a as the motor 42 drives the elevator unit 4. As the pipe members 5 are carried above the columns 34 and over the upper sprockets 38, the pipe members 5 are dropped onto a pipe feeder 29, and are flatly supported by a plane which is slightly inclined from a horizontal plane towards a succeeding station (FIG. 3).

If the nominal length of the pipe members 5 is desired to be changed, the dump table 27 is restored to its horizontal position. Then, the pipe members 5 which were being carried by the elevator unit 4 are dropped back into the bin 2. There would be a small number of pipe members 5 left at the top most part of the elevator unit 4 without being returned to the bin 2, but they can be either automatically or manually accounted for, or, alternatively, they may be simply put back to the bin 2 manually as they are in readily accessible part of the elevator unit 4.

The pipe feeder 29 is located adjacent to the upper end of the elevator unit 4 to receive the pipe members 5 therefrom. The pipe feeder 29 temporarily accumulates the pipe members 5 and passes them to the succeeding length measuring station 6 one by one.

According to the above described embodiment, the bin 2 was tipped towards the elevator unit 4 in order to allow transfer of the pipe members 5 therebetween, but it is also possible to tip the elevator unit 4 towards the bin 2, to laterally translate one towards the other, or to combine the tipping movement and the lateral translational movement of the bin 2 and/or the elevator unit 4.

Thus, according to the present embodiment, feeding of rod-like members can be made in highly efficient manner by using an extremely simple system. Furthermore, changing the pipe members can be simply performed, and the same pipe feed station can be adapted to different rod-like members simply by charging different rod-like members into different bins.

The length measuring station 6 is provided with two pairs of rollers 44 to support each of the pipe members 5 thereon at three longitudinally spaced parts thereof, a contact wall 30 at a lateral end (a longitudinal end of the pipe member 5), and a measuring unit 32 at its other lateral end.

The measuring unit 32 comprises a stand 55 which is slidably supported by a guide rail 54 fixedly secured to a base plate 53 and extending in parallel with the axial line of the pipe members 5, and a pusher device 56. The stand 55 can be fixedly secured at any position along the guide rail 54 by fastening lock bolts 58 which can selectively engage the stand 55 to the guide rail 54. The pusher device 56 comprises a cylinder device 59 which may be actuated, for example, by compressed air, a push head 63 slidable received by an upper part of the table 55 by way of a slide block 64, a push rod 62 coupled with an external end of a piston rod 60 of the cylinder device 59 by way of a clevis joint 61, and a compression coil spring 65 urging the push head 62 away from the cylinder device 59. The movement of the pusher head 63 away from the cylinder device 59 is limited by engagement between an annular shoulder surface 63a of the push head 63 and a large-diameter portion 62a of the push rod 62.

A recess 66 is formed in a part of the outer circumferential surface of the push head 63 so as to be detected by a proximity sensor 67 mounted on the slide block 67.

As shown in FIG. 7, a gage bolt 68 is fixedly secured to a part of the base plate 53 adjacent to the table 55 in parallel with the axial line of the measuring unit 32. To the gage bolt 68 are fixedly secured a plurality of reference flanges 69, and nuts N threaded with the gage bolt 68 so as to oppose the associated reference flanges 69 defining certain gaps therebetween. The positions of the reference flanges 69 correspond to the different lengths of the pipe members 5 that are going to be measured, and the table 55 is provided with a hook 70 which can pivot vertically. By fitting the hook 70 into the gap between one of the reference flanges 69 and the associated nut N, the position of the table 55 can be adjustably determined.

Now the operation of the length measuring station 6 is described in the following.

First of all, the hook 70 is engaged with one of the reference flanges 69, and is secured against the flange 69 by fastening the associated nut N. At the same time, the lock bolts 58 are also fastened to secure the stand 55 to the base plate 53. When a new pipe member 5 is placed upon the rollers 44, the pneumatic cylinder device 59 is actuated and the piston rod 60 is pushed out therefrom. The push head 63 is thus pushed against an end of the pipe member 5 and pushes the pipe member 5 against the contact wall 30 at its other end. The push head 63 then comes to a stop, and any over-stroke of the push rod 62 is accommodated by the deflection of the compression coil spring 65. When the length of the pipe member 5 is proper, the recess 66 aligns with the proximity sensor 67 which in turn produces a prescribed output signal. Then, in response to the output signal from the proximity sensor 67, the pipe gripper 9 picks up the pipe member 5 and carries it away to the succeeding station. On the other hand, if the length of the pipe member 5 is found to be outside the acceptable range and the alignment between the recess 66 and the proximity sensor 67 fails to take place, no signal is produced from the proximity sensor 67. Then, the pipe member 5 is pushed out from the rollers 44 and dropped into a reject bin 46.

When the nominal length of the pipe members 5 that are going to be handled is to be changed, for instance to produce seat frames for different car models, the position of the stand 55 is changed along the guide rail 54 by disengaging the hook 70 from the reference flange 69 and loosening the lock bolts 58.

The detection action by the proximity sensor 67 may be triggered by an output from a limit switch (not shown in the drawings) which detects the full stroke of the piston rod 60. Also, the proximity sensor may be either electromagnetic or photoelectric. Alternatively, a potentiometer or other means may be used to detect the displacement of the push head 63 from its rest position to its final position to determine the length of the pipe member 5. If the gage bolt 68 can be replaced with another carrying reference flanges in different locations, it is possible to cover an even larger variety of the lengths of the pipe members 5.

Thus, according to the present embodiment, the lengths of different pipe members can be measured simply by moving the table 55 to appropriate locations without changing the time required for the measurement of each pipe member. This is significant when the length measuring station is a part of a large manufacturing line involving a large number of different stations which are required to be synchronized with one another for efficient operation of the entire manufacturing line. Also, since the measurement does not require any actual measurement of any value according to the present embodiment, the process as well as the device for measurement can be simplified.

What we claim is:

1. A system for producing a three-dimensional frame structure from a rod-like member, comprising:
   a work feed station for individually feeding a rod-like member;
   a bending station for bending said rod-like member having a prescribed length fed from said work feed station into a two-dimensional framed structure;
   a welding station for welding two mutually abutting parts of said two-dimensional frame structure of said rod-like member transferred from said bending station together; and
   a forming station for plastically forming said two-dimensional frame structure into a three-dimensional frame structure;
   wherein said work feed station comprises a bin for storing a plurality of rod-like members in mutually parallel relationship, an actuator for tipping said bin around a center line extending in parallel with said rod-like member toward said elevator and an elevator located adjacent to said bin, said bin including a slot narrower than a length of said rod-like member and extending vertically along a substantially entire height of a side of said bin facing said elevator, and said elevator including endless chain means carrying a plurality of arm members which project into said bin through said slot and are adapted to be moved substantially in upward direction along said slot.

2. A system according to claim 1, wherein said work feed station further comprises a carriage adapted to be moved along a rail extending in parallel with said rod-like members for replacing said bin with another.

3. A system according to claim 1, wherein a length measuring station is provided between said work feed station and said bending station, said length measuring station comprising a stationary reference wall supported by a base at one of its lateral ends, a pusher member slidably received by said base at the other lateral end so as to be moved toward and away from said reference wall, an actuator for effecting a sliding movement of said pusher member, work guide means for guiding said rod-like member into a space defined between said reference wall and said pusher member with one end of said rod-shaped member adjoining said reference wall and the other end of said rod-like member adjoining said pusher member, and measuring means for measuring a travel of said pusher member as it is moved by said actuator from its rest position to a final position at which said rod-like member abuts said reference wall at its one end and said pusher member at its other end.

4. A system according to claim 3, wherein said pusher member is supported by said base by way of adjustable means for adjusting the position of said rest position relative to to said reference wall.

5. A system according to claim 3, wherein measuring mean comprises a sensor for detecting a final position of said pusher member when said rod-like member abuts both said reference wall and said pusher member.

* * * * *